(12) United States Patent
Lin et al.

(10) Patent No.: US 7,304,019 B2
(45) Date of Patent: *Dec. 4, 2007

(54) CONCENTRATED SUSPENSIONS

(75) Inventors: Lijun Lin, Stafford, TX (US); Alejandro Pena, Ciudad Ojeda (VE); Golchehreh Salamat, Sugar Land, TX (US); Michael D. Parris, Richmond, TX (US); Geoff Robinson, Spring, TX (US)

(73) Assignee: Schlumberger Technology Corporation, Sugarland, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/421,236

(22) Filed: May 31, 2006

(65) Prior Publication Data

US 2006/0276347 A1    Dec. 7, 2006

Related U.S. Application Data

(63) Continuation-in-part of application No. 10/103,221, filed on Mar. 21, 2002, now Pat. No. 7,199,084.

(51) Int. Cl.
  *C09K 8/34* (2006.01)
  *C09K 8/94* (2006.01)

(52) U.S. Cl. .............. 507/115; 507/110; 507/112; 507/113; 507/114; 507/136; 507/211; 507/214; 507/215; 507/216; 507/217; 507/261

(58) Field of Classification Search ........ None
See application file for complete search history.

(56) References Cited

U.S. PATENT DOCUMENTS

| | | | |
|---|---|---|---|
| 4,176,107 A | 11/1979 | Buckman et al. | |
| 4,312,675 A | 1/1982 | Pickens et al. | |
| 4,330,414 A * | 5/1982 | Hoover ............... | 507/114 |
| 4,499,214 A | 2/1985 | Sortwell | |
| 4,566,977 A | 1/1986 | Hatfield | |
| 4,717,488 A * | 1/1988 | Seheult et al. ......... | 507/211 |
| 4,799,962 A | 1/1989 | Ahmed | |
| 4,828,034 A | 5/1989 | Constien et al. | |
| 4,846,992 A | 7/1989 | Fonsny | |
| 5,004,556 A | 4/1991 | Julemont et al. | |
| 5,091,448 A | 2/1992 | Hostettler et al. | |
| 5,246,490 A | 9/1993 | Kehoe et al. | |
| 5,362,312 A | 11/1994 | Skaggs et al. | |
| 5,710,108 A | 1/1998 | McNally et al. | |
| 5,939,475 A | 8/1999 | Reynolds et al. | |
| 5,969,012 A | 10/1999 | Harris et al. | |
| 6,113,891 A | 9/2000 | Burdick et al. | |
| 6,133,411 A | 10/2000 | Arranaga et al. | |
| 6,165,947 A | 12/2000 | Chang et al. | |
| 6,225,264 B1 | 5/2001 | Moorhouse et al. | |
| 6,251,838 B1 | 6/2001 | Moorehouse et al. | |
| 6,302,209 B1 | 10/2001 | Thompson, Sr. et al. | |
| 6,342,467 B1 | 1/2002 | Chang et al. | |
| 6,451,743 B1 | 9/2002 | Fox | |
| 6,561,273 B2 | 5/2003 | Brothers et al. | |
| 6,620,769 B1 | 9/2003 | Juppe et al. | |
| 6,743,756 B2 | 6/2004 | Harris, Jr. | |
| 6,800,593 B2 | 10/2004 | Dobson, Jr. et al. | |
| 6,818,597 B2 | 11/2004 | Harris | |
| 6,887,833 B2 | 5/2005 | Brothers et al. | |
| 7,199,084 B2 * | 4/2007 | Parris et al. ............ | 507/136 |
| 2003/0045434 A1 | 3/2003 | Brothers et al. | |
| 2003/0236173 A1 | 12/2003 | Dobson, Jr. et al. | |

FOREIGN PATENT DOCUMENTS

EP    0280341 A1    8/1988

OTHER PUBLICATIONS

Yeager, R. R. and Bailey, D.E., Diesel-Based Gel Concentrate Improves Rocky Mountain Region Fracture Treatments, SPE Paper 17535, presented at the SPE Rocky Mountain Regional Meeting held in Casper, WY, May 11-13, 1988.
Constien, V. G., et al., Continuous Mix Technology Adds New Flexibility To Frac Jobs, Oil & Gas Journal, 86, No. 23, pp. 49-54.

* cited by examiner

*Primary Examiner*—David J. Buttner
(74) *Attorney, Agent, or Firm*—Thomas O. Mitchell; David Cate; Robin Nava

(57) ABSTRACT

Suspensions are provided of water-soluble materials in non-aqueous carrier fluids using suspension agents that include organophilic clays. Methods of forming such suspensions are provided. Methods are also provided for using such suspensions to prepare aqueous solutions, in particular thickened aqueous solutions, in particular for use in oilfield treatments.

17 Claims, 4 Drawing Sheets

CONCENTRATED SUSPENSIONS

CROSS REFERENCE TO RELATED APPLICATION

This application is a Continuation-In-Part of and also claims the benefit of U.S. patent application Ser. No. 10/103,221 filed on Mar. 21, 2002 now U.S. Pat. No. 7,199,084.

TECHNICAL FIELD OF THE INVENTION

The present Invention relates to the preparation and use of concentrated stable suspensions in non-aqueous carrier fluids of water-soluble solid materials that are to be added to aqueous liquids to form aqueous solutions or suspensions. More particularly, the Invention relates to the use of mutual solvents as carrier fluids for the suspensions, thus eliminating the need for including surfactants, and yet allowing very rapid contact of the suspended solid with the aqueous liquid.

BACKGROUND OF THE INVENTION

Thickened aqueous fluids are widely used in industry. Such fluids are typically thickened in order to increase viscosity or suspend particles. The thickeners may also stabilize emulsions; flocculate particles; act as binders, film formers, lubricants and friction reducers; or perform many other functions. They are commonly used in paints and coatings, inks, textile finishing, agricultural chemicals, cosmetics, foods, and many other industries. One industry of particular interest is the energy industry, where aqueous thickened fluids are used in many well treatments such as drilling, completion, fracturing, acidizing, cleanout, gravel packing and the like.

Water-based well treatment fluids often contain a hydratable polymer that acts to thicken the fluid and may be further thickened by chemical crosslinking. Such a polymer typically is made available in either a powder for or a suspended form in a carrier fluid such as a hydrocarbon such as No. 2 diesel oil, and is hydrated upon the surface. (Such suspensions are often called slurries; the terms "slurry" and "suspension" are considered to be interchangeable, although the term suspension will be used here.) In general, the powder or suspension must provide polymers that hydrate rapidly. Dry polymer particles must first be dispersed so that individual particles can absorb water; otherwise, some of the polymer will not hydrate and lumps (that contain dry powder inside a gelatinous coating) will form. For this reason, suspensions are usually preferred over dry polymer particles, if stable hydratable suspensions can be prepared. Once the polymer is dispersed, its ability to absorb water will determine the hydration rate. Natural polymers are most commonly used, especially polysaccharides, such as guar and derivatives of guar such as hydroxypropyl guar (HPG), carboxymethylhydroxypropyl guar (CMHPG), carboxymethyl guar (CMG), and hydrophobically modified guar, or hydrophobically modified guar derivatives.

Fluids may be batch-mixed or continuously mixed. For batch-mixed, water-based fluids, additives such as bactericide, polymer, salt, buffer, acid or base, clay stabilizer, etc., are mixed together in tanks with the water before pumping. The polymer is given sufficient time to hydrate in the tanks before the job begins. Batch mixing affords the best opportunity for quality assurance. Unfortunately, it also results in wasted materials if not all can be used. Obstacles facing the well-treatment industry also include large costs and environmental effects of operating and conducting treatments. Large costs are associated with storing and maintaining numerous liquids in large quantities in various, and sometimes remote, regions of the world. Further, the environmental effects of spillage and relatively large leftover quantities of fluid on site (tank bottoms) are increasingly becoming a problem for operators, as disposal of fluids is particularly troublesome under newer and more stringent environmental regulations. From a cost standpoint, continuously mixed fluid is more desirable. In this mode, all materials are added on the fly, so there is no wasted fluid and no unnecessary expense. Concentrated suspensions of guar or guar derivatives or the like in diesel or other liquids (called carrier fluids) were developed so that the polymer could be accurately metered and so that it would disperse and hydrate rapidly enough for continuous mixing (Constien, V. G., et al., Oil & Gas Journal, 86, No. 23, pp. 49-54, 1988; Yeager, R. R, and Bailey, D. E., SPE 17535, 1988). Because of environmental considerations and disposal costs, most aqueous-based fracturing fluids are now continuously mixed. Of course, it would still be desirable if the carrier fluid were environmentally friendly, in case of accidental spills.

Concentrated suspensions useful in a continuous process for supplying a viscous fluid for treatment of subterranean formations have been developed. Such a concentrated suspension typically involves a polymer suspension wherein a hydratable polymer is dispersed in a hydrophobic solvent (generally an oil-based fluid) in combination with a suspension agent and a surfactant, with or without other optional additives commonly employed in well treatment applications. Because of the inherent dispersion of the hydratable polymer in the oil-based fluid (i.e., lack of affinity for each other), such concentrated suspensions tend to eliminate lumping and premature gelation problems and tend to optimize initial dispersion when added to water. However, the rate of hydration of the polymer is still a critical factor particularly in continuous mix applications wherein the necessary hydration and associated viscosity rise must take place over a relatively short time span corresponding to the residence time of the fluids during the continuous mix procedure. Also, surfactants are needed when hydrophobic solvents such as diesel are used because without them there is a delay in wetting the polymer particle and subsequently hydrating it when the suspension is mixed with water for blending the oilfield service fluid; the surfactant helps to remove the oil, such as diesel, from the particles and allows the polymer particles to hydrate. In such applications, hydration is the process by which the hydratable polymer absorbs water, and is necessary for the development of increased viscosity. Once the polymer is dispersed, its ability to absorb water will dictate hydration or hydration rate. Several factors will determine how readily the polymer will hydrate or develop viscosity; e.g., the pH of the system (particularly for natural polymers), the amount of mechanical shear applied in the initial mixing phase, the polymer particle size, the concentration of salts, and the polymer concentration. Hydration rate can be influenced through pH control agents, which may be blended with the polymer suspension or added to the aqueous medium.

Typical suspensions used in the industry might comprise about 45 to 55% of No. 2 diesel oil as a hydrophobic solvent and about 45 to 55% of a "dry" polysaccharide powder (if the suspension is to be used to make a viscous aqueous fluid). The "dry" polysaccharide powder typically contains about 1 to 3% water, up to about 1% of a surfactant or dispersant, up to about 1% of an agent such as silica, and about 1 to 3% of a clay. The silica keeps the polysaccharide free flowing when it is in the "dry" powder form, and therefore is often termed a "free-flow" agent or additive. The surface of the clay is typically treated with an organic material to render it hydrophobic; such clays are termed organophilic. These clays aid in maintaining the polysaccharide in suspension when the dry polysaccharide is subsequently added to the carrier fluid to form the suspension.

Many oil-based fluids have been used as hydrophobic solvents. Diesel is most common. As an alternative, U.S. Pat. No. 5,091,448 describes use of a mixture of an oil, especially an isoparaffin oil, and a resin such as hydrogenated styrene/isoprene block copolymers. Attempts to avoid water-immiscible hydrocarbons have been made, to reduce toxicity, improve biodegradability, and avoid sheens on water. U.S. Pat. No. 4,176,107 describes water-soluble polyalkylene glycols having at least four ethyleneoxy units each or at least three propyleneoxy units each; or water-soluble polyethoxylated alcohols, polyethoxylated alkyl phenols or polyethoxylated fatty acids all having at least three ethyleneoxy units each. These expensive materials may be diluted with less expensive co-solvents: for example alcohols such as 2-octanol, tri- and tetraethyleneglycols, ethers such as the methyl, ethyl, propyl or butyl ethers of glycols, ketones such as diacetone alcohol, amides such as dimethylformamide, and esters such as methoxyethyl acetate. U.S. Pat. No. 4,799,962 describes a mixture of water and low molecular weight (about 200 to about 700, preferably at least 250) and high molecular weight (greater than about 3000) polyethylene glycols or methoxylated polyethylene glycols. U.S. Pat. No. 5,969,012 describes polyalkylene glycols with amine phosphate ester salt stabilizers. These alternatives do not solve all the problems associated with the use of such concentrated suspensions. For example, they may be too viscous, particularly at lower temperatures.

Unfortunately, the surfactants that are needed add to the cost and complexity of the system, and very importantly, surfactants commonly used in these systems, such as nonyl phenol ethoxylates, are toxic to many biota. They are, for example, banned for use in the North Sea. The surfactant or dispersant used in suspensions prepared in the past is generally any such material that is capable of both wetting the suspension agent for dispersion in the hydrophobic solvent and stripping the hydrocarbon from the polymer particles upon introduction into the water to allow hydration of the polymer. As such, the required surfactants typically included ethoxylated nonylphenol, alkyloxylated alcohols having polymerized propylene oxide and/or ethylene oxide, other copolymers of propylene oxide and ethylene oxide or the like, glycol ethers, various derivatives thereof and mixtures. The surfactant is often an ethyoxylated nonyl phenol employed at a concentration of about 0.2 to about 5.0% by weight of the concentrate. These surfactants typically are not environmentally friendly. There is a need in many industries, such as the oilfield industry, for compositions and methods of making environmentally friendly, surfactant-free suspensions of water-soluble materials in non-aqueous solutions and then for using the suspensions to make aqueous fluids.

SUMMARY OF THE INVENTION

It is an object of the Invention to provide a suspension of a hydratable material in a non-aqueous carrier fluid using a suspension agent that includes a thixotropic agent, optionally, an organophilic clay, and no surfactant. The carrier fluid is selected from mutual solvent compounds having the formula

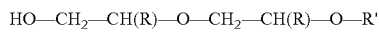

in which R is H or methyl and R' is H or alkyl having from 1 to 4 carbon atoms, and the molecular weight is less than about 200; mutual solvent compounds having the formula

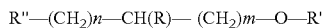

in which R is H or methyl, R' is H or alkyl having from 1 to 4 carbon atoms, R" is H or OH, n is from 0 to 3, m is from 1 to 3, the sum of n plus m is from 1 to 5, and the molecular weight is less than about 200; and from biodiesel and from mixtures thereof. The mutual solvents may also be mixed with an aliphatic hydrocarbon liquid where there is a hydroxyl functional group in the chemical structure of the mutual solvent.

It is a further object of the Invention to provide methods of preparing such suspensions.

It is a further object of the Invention to provide methods of using such suspensions.

It is yet a further object of the Invention to provide well treatment methods using the suspensions of the Invention.

The suspensions of the Invention of water-soluble thickening agents in carrier fluids suitable for use in the oilfield meet important requirements. They have a sufficient polymer concentration to be efficient in use (that is require as little carrier fluid as possible) and yet are not too viscous to be pumped and used in oilfield equipment, even at low temperatures. The polymers are not soluble in the carrier fluids. The suspensions have a low rate of settling or of forming a soft-pack or hard-pack, and if minor settling does occur, the polymers are easily re-suspended. When the suspensions are added to water, the polymers hydrate (and therefore form a viscous system) rapidly. The suspensions do not contain surfactants, which are usually not environmentally friendly and often interfere with other desired properties (for example by affecting wetting or foaming characteristics). The suspensions are usable in current oilfield equipment (pumps, mixers, etc.).

In addition, most of the suspensions of the Invention have the added advantage that the carrier fluid has a high flash point and a low pour point or freezing point. Another advantage, as opposed to diesel, is that most of the carrier fluids of the Invention are combustible rather than flammable, not carcinogenic, not toxic to marine biota, biodegradable, do not exceed oil and grease limits allowable in discharged water, and do not form sheens on water surfaces.

In some instances, mutual solvents containing at least one hydroxyl functional group are mixed with an aliphatic hydrocarbon, such as mineral oil, to form a suspension or slurry with hydrophobically modified hydroxypropyl guar (HMHPG). The aliphatic hydrocarbon is typically non-thickening to avoid high viscosities or extensive formation of hard cakes. Biodiesel also works effectively with HMHPG.

There are also analogous situations in which the suspensions of the Invention are used to add organic or inorganic water-soluble solids, other than polymers, to aqueous liquids in the initial form of non-aqueous suspensions (because for example their controlled dissolution in the aqueous liquid is important to a process) and then achieve rapid contact of the solid with the water without the need for a surfactant to achieve rapid "wetting" of the solid. Such situations arise in many industries. In the case of oilfield treatment fluids, such solids are breakers, delay agents, crosslinking agents, accelerating agents, and the like. A typical example is one in which the material to be added is normally added to the fluid as a solid, but for equipment or other practical reasons it is necessary or more efficient to add the material as a liquid (suspension) if it is available as such.

DETAILED DESCRIPTION OF THE INVENTION

Figure 1:
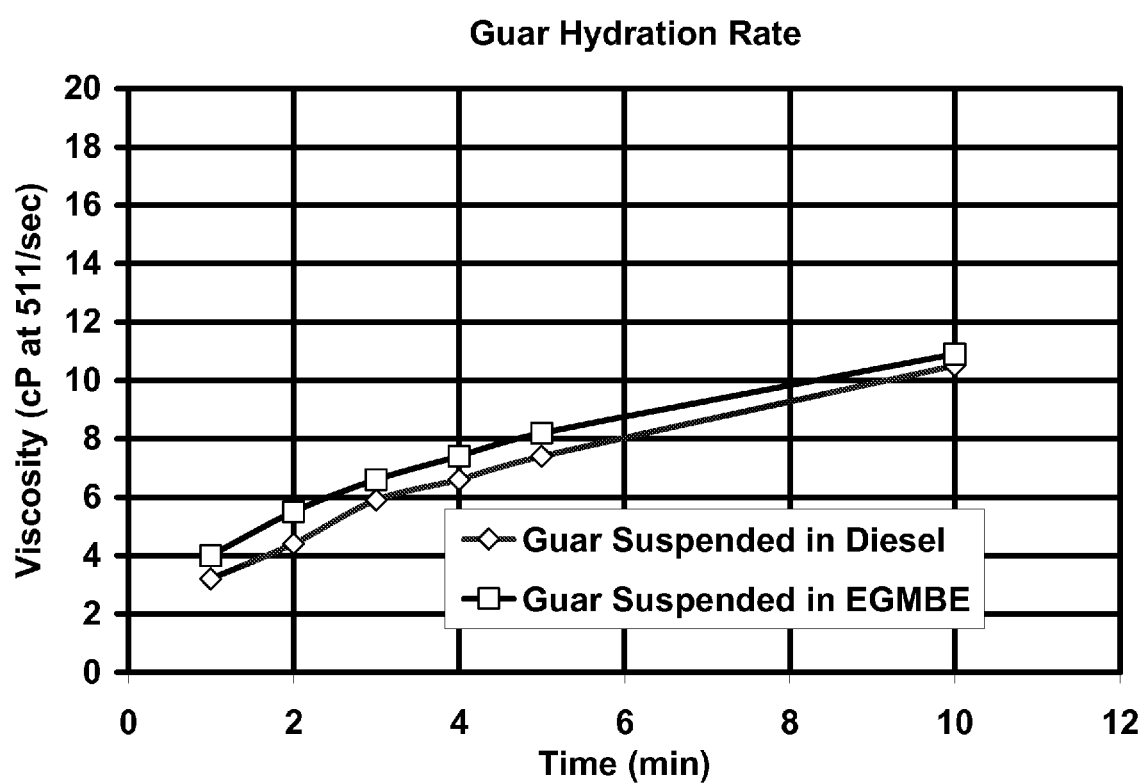
FIG. 1 compares the hydration rates of suspensions of guar in No. 2 diesel oil and in ethylene glycol monobutyl ether.

Although the Invention will generally be described in terms of compositions and methods involving polymer suspensions for use in making oilfield treatment fluids, the Invention is not limited to suspensions neither of only polymers or to use only in the oilfield.

According to the present Invention, when described in terms of polymer suspensions (although other materials could be suspended), a composition is provided that is a stable, pumpable, high concentration polymer suspension of a high molecular weight, water-soluble polymer phase dispersed in a carrier fluid that is to be transported to the well site, or generated at the well site, and then continuously or batch admixed with an appropriate water solution such as to produce the desired viscosity rise in the well treatment fluid on a real time basis. Generally, the improved compositions and methods according to the present Invention can be employed in conjunction with any high concentration polymer suspension comprising a hydratable high molecular weight polymer suspended in a suitable carrier fluid. Typically such a suspension is made up of three ingredients; namely, a hydratable polymer, a carrier fluid, a suspension agent. These terms are defined in detail below. Note that while organophilic clays are often considered to be thixotropic agents, for clarity of discussion here, the term "thixotropic agent" does not include organophilic clays. The suspension agent may comprise a thixotropic agent and/or an organophilic clay. Also, free-flow agent may be included in the suspension. A small amount of water may be present in the "dry" polymer from which the concentrated suspension is made. For polymers such as conventional guars, the term high concentration as used herein refers to a total solids loading of the concentrated suspension at weight levels in excess of about 30% and typically up to about 60%. A more preferred range is about 35% to about 50%; the most preferred range is about 42% to about 49%. For certain polymers (such as those provided in unconventional particle sizes) or for materials other than polymers, that have densities significantly different from those of the polymers, the loadings may be different. The term pumpable refers to the lack of viscosity buildup in the concentrated suspension over a wide temperature range; pumpable fluids typically have a viscosity of less than about 600 cP (as measured on a Fann 35 rheometer with an R1/B1 configuration). The term stable refers to the concentrated suspension exhibiting minimal polymer separation and no polymer soft-packing (defined as particle stratification that is easily remixed) or hard-packing (defined as particle stratification that results in a concentrated layer that is hard and difficult to re-suspend) for sustained periods of time, typically in excess of a week or more. For guars and substituted guars, typical particle sizes are 20 to 500 mesh (U.S. sieve sizes) although smaller and larger particles can be suspended.

The suspension of hydratable polymer, which in an aqueous medium inherently results in a buildup of viscosity, results in only a minimal viscosity rise in the carrier fluid of the Invention, even at high concentration in the suspension. Consequently the polymer suspension according to the present Invention remains readily pumpable and builds viscosity only upon admixing with water, aqueous brine or the like. When incorporated, the organophilic clay and/or thixotropic agent (collectively the suspension agent) are present to maintain the polymer in a highly dispersed and suspended state within the carrier fluid without significant settling or separation of polymer. This is achieved by virtue of the suspension agent's thixotropic behavior in the carrier fluid. No surfactant is necessary to wet the polymer or suspension agent for dispersion in the carrier fluid or for stripping the hydrocarbon from the polymer particles upon admixing the concentrate with the aqueous phase when making the final high viscosity oilfield service fluid.

The concentrated suspension may be prepared, transported and stored in a number of ways. The dry powdered polymer may be obtained from a supplier with only the free-flow additive (if present) already included, or with all dry components already included. This powder may then be mixed with the carrier fluid at a central location or on the site of an oilfield treatment job. The other dry components, including free-flow agent if it is needed and was not in the original dry powdered polymer, may be added before, during, or after mixing with the carrier fluid. The final suspension may be prepared in a tank equipped with a means of recirculation (constant re-mixing) in order to maintain all components in suspension, or it may be mixed in a tank with blending capability but without recirculation capability. If recirculation is not available, the suspension is preferably generated just before it is used, although it may be stored and then re-suspended later if necessary. Optionally, the suspension may be entirely prepared by a supplier and delivered to a storage facility or directly to the work site; in either case it may be delivered to a tank that does or does not have recirculation capability, depending upon how long it is stored in the tank before use. In some of these preparation, transportation and storage sequences, settling could be a problem; in others settling would not be a problem. The suspensions and methods of the Invention are particularly suited to use offshore because the chemicals are biodegradable, non-toxic to marine species, do not exceed oil and grease limits for discharged water, and generally do not cause a sheen on water surfaces.

Viscosified aqueous fluids may be used in a large number of oilfield treatments. The fluids of the Invention may be used in conventional equipment using conventional techniques without special adaptation of the fluids, the equipment, or the treatments. Such treatments include (but are not limited to) drilling, completion, stimulation (acidizing or acid fracturing or hydraulic fracturing), remediation or workover, cleanout, and scale removal. Such treatments may also be employed in wells drilled for purposes other than the production of oil and gas, for example for production of other fluids such as water, brine, or carbon dioxide; for injection of displacement fluids in enhanced oil recovery; or for injection of fluids for storage or disposal.

The carrier fluid or solvent base according to the present Invention can generally be any fluid that will suspend a dispersion of the suspension agent and the hydratable polymer to form a suspension in which the polymer is not soluble, and the suspension has a relatively high polymer concentration but a viscosity low enough to be pumpable under oilfield service conditions. The carrier fluid also must not hydrate the polymer being suspended. The polymer must not be readily soluble in the solvent or the concentrated suspension may become too viscous or may form a liquid or a solid. The carrier fluid base can be selected from one of three groups of compounds. The first group includes low-viscosity, low-volatility mutual solvents and mixtures thereof as generally known in the art. By "mutual solvent" is meant a material that help forms a suspension of hydrophobic materials (such as hydrophobically modified guars) in water, but the mutual solvent must not dissolve the hydrophobic materials. Mutual solvents include by way of non-limiting examples various alcohols, glycols and glycol ethers such as: ethylene glycol monobutyl ether (EGMBE) (available from The Dow Chemical Company, Midland, Mich., under the trade name Dowanol® EB), hexylene glycol, 2-methyl hexanol, propylene glycol n-butyl ether, ethylene glycol methyl ether, ethylene glycol ethyl ether, dipropylene glycol methyl ether (available from The Dow Chemical Company, Midland, Mich., under the trade name Dowanol® DPM), dipropylene glycol n-butyl ether (available from The Dow Chemical Company, Midland, Mich., under the trade name Dowanol® DPnB), diethylene glycol ethyl ether, propylene glycol, diethylene glycol methyl ether, and the like. Mutual solvents containing at least one pendent hydroxyl functional groups in their chemical structure, when used in conjunction with hydrophobically modified hydroxypropyl guars (HMHPG's), may be typically used with a hydrocarbon solvent such as mineral oil. Mutual solvents not containing pendent hydroxyl functional groups, will typically be used without a hydrocarbon, when used with hydrophobically modified hydroxypropyl guars (HMHPG's). Not all mutual solvents are suitable; excluded are those that are too viscous or that form polymer suspensions that are too viscous under normal operating conditions. (It is highly desirable to have one formulation that can be used under all conditions, and very undesirable to have a formulation that cannot be used under certain conditions.) For example, larger polyethylene glycols (PEG's), even relatively low molecular weight materials such as PEG 200 or PEG 400 are not suitable because they are too viscous and/or form suspensions that have viscosities that are too high. Suitable mutual solvents have molecular weights less than about 200; preferred are those that have freezing points lower than about −75° C., and viscosities less than about 5 cP at 25° C.

The second group of compounds from which the carrier fluid may be selected comprises any of the mono alkyl esters of long chain fatty acids, derived from vegetable oils or animal fats, that are commonly termed "biodiesel". These are known materials in the fuels and engine industries, as fuels for compression-ignition (diesel) engines. The pure materials are known as "B100" biodiesel. Mixtures with conventional petroleum diesel fuels are known as "Bxyz" biodiesel, where xyz is the percent biodiesel in the fuel. Only B100 is useful in the present Invention. Biodiesel is made by reacting the vegetable oils and/or animal fats with an alcohol; methanol is the usual choice but other alcohols may be used. Biodiesel is non-toxic and biodegradable. Biodiesel is available from many sources, including Biodiesel Industries, Marathon, Fla.; Stepan Company, Northfield, Ill.; and West Central Soy, Ralston, Iowa. Biodiesel is formulated for its burning characteristics, and certain physical properties such as pour point, volatility and boiling point. Its characteristics as a solvent and its miscibility with other materials are not a factor in its manufacture.

A third group of compounds from which the carrier fluid may be selected comprises aliphatic hydrocarbon solvents. Typically, the aliphatic hydrocarbon is used in mixture with the mutual solvents containing pendent hydroxyl functional groups. Suitable examples of aliphatic hydrocarbons include, but are not limited to: cyclohexane; Exxsol® solvents commercially available from ExxonMobil including Exxsol® D40, D60, D80, D110, and the like; heptane; hexane; lactane; mineral oil; mineral seal oil; mineral spirits; VM & P naphtha; kerosene; hydrotreated kerosene; middle distillate fuels; isoparaffinic and naphthenic aliphatic hydrocarbon solvents; dimers and higher oligomers of propylene; butane; and the like. Particularly preferred is a naphthenic type hydrocarbon solvent having a boiling point range of about 91.1° C.-113.9° C. (196°-327. degree. F.) sold as "Exxsol® D80" by ExxonMobil, Houston, Tex. While any functional amount of aliphatic hydrocarbon maybe incorporated into the suspension, preferably the amount of aliphatic hydrocarbon is up to about 25% by weight based on total suspension weight, preferably about 5% to about 20% by weight based on total suspension weight, more preferably about 7% to about 17% by weight based on total suspension weight It is to be understood that the carrier fluid can be a mixture of mutual solvents, a mixture of biodiesels, or a mixture of the two, including mixtures of mixtures. The mutual solvents and biodiesel of the invention are much more environmentally friendly than diesel. For example, diesel is defined as flammable, ethyleneglycol monobutyl ether and biodiesel are defined as combustible. Diesel is very toxic to marine biota, while ethyleneglycol monobutyl ether and biodiesel are not. Diesel is a known carcinogen, while ethyleneglycol monobutyl ether and biodiesel are not. Diesel is not biodegradable, while ethyleneglycol monobutyl ether and biodiesel are. Diesel and biodiesel do not meet the U.S. regulations against forming a sheen on water surfaces or for oil and grease in discharged water (see below); ethylene glycol monobutyl ether passes.

The hydratable polymer according to the present Invention may be essentially any relatively high molecular weight water-soluble, viscosity-enhancing biopolymer or mixture of biopolymers as generally known in the art which yield viscosity (i.e., produce a viscosity rise) upon hydration. Thus, the polymers useful in the present Invention include, by way of example but not limited thereto, any natural or modified natural polymers including polysaccharides and modified polysaccharides and related polymeric materials such as guar, hydroxypropyl guar (HPG), hydrophobically modified hydroxypropyl guar (HMHPG), carboxymethyl guar (CMG), carboxymethyl hydroxypropyl guar (CM-HPG); carboxymethyl hydroxyethyl cellulose (CMHEC), carboxymethylcellulose, other cellulosics and cellulosic derivatives such as hydroxyethylcellulose and hydroxypropylcellulose; xanthan gum, modified starches, glucomannan gums, succinoglycan, scleroglycan, o-carboxychitosans, polyvinylsaccharides, heteropolysaccharides (such as diutan by nonlimiting example), and similar biopolymers and mixtures thereof. Of course, a specific polymer may not be used in a specific carrier fluid if the polymer is sufficiently soluble in the carrier fluid as to raise the viscosity of the suspension to a value so high that the suspension cannot be readily pumped. Preferably, the hydratable polymer to be used according to the present Invention is guar or a guar derivative. It should be noted that even the same nominal polymer prepared by different suppliers will have different behaviors with respect to suspension settling and hydration and final aqueous fluid viscosity. In fact, polymers deliberately prepared to hydrate quickly are available. Persons of ordinary skill in the art of preparing viscosified aqueous fluids will know how to adjust for these differences, and it is within the scope of this Invention to vary the amounts of polymer, carrier fluid and additives to produce the desired suspension settling and hydration rates and final aqueous fluid viscosity.

When the hydratable polymer is a hydrophobically modified hydroxypropyl guar, any suitable HMHPG may be used. A nonlimiting example of a particularly useful HMHPG is Polyflos HM22/XF, commercially available from Lamberti Spa, Gallarate, Italy. Most typically, hydratable polymer powders, in solid form, are used to prepare slurries, especially those powders offering the highest surface area without causing agglomeration during the process.

In some embodiments, organic solvents used comprise a thickening solvent and a non-thickening one. The non-thickening solvent is preferably an aliphatic hydrocarbon and the like, the presence of which essentially suppresses any thickening effect toward polymer particles induced by the thickening solvent. It is likely that hydrophobic interactions between alkane molecules and hydrophobic groups of a HMHPG polymer play an important role in the uniform dispersal of polymer particles.

The water typically used to make aqueous viscosified fluids may be fresh or may contain salts. Unmodified guar develops viscosity in all electrolyte systems such as those containing KCl, NaCl, and $CaCl_2$ at high concentrations. Guar gum hydrates most efficiently in the pH range of 7-8. Guar will not hydrate in organic solvents such as methanol. Hydroxypropyl guar (HPG) hydrates well in many salt systems at 26° C., and also develops excellent viscosity at temperatures of 4° C. Depending on the mechanical shear applied, over 90% of the viscosity can be achieved within ten minutes. Optimum hydration of HPG can be realized in the pH range of 4-6. HPG also viscosifies mixtures of methanol and 2% KCL water used typically in a ratio of 50:50. Carboxymethyl hydroxypropyl guar (CMHPG) hydrates in most electrolyte make-up solutions; however, the viscosity yield of CMHPG is more sensitive to the salts in these solutions than are those of guar and HPG. CMHPG hydrates well in both cold and warm water.

The suspension agent used according to the present Invention can be a "thixotropic agent" (as defined below) and may be a clay, most preferably an organophilic clay. In some instances, it is a mixture of an organophilic clay and a thixotropic agent.

Preferably, the organophilic clay portion of the suspension agent to be employed in the present Invention is a highly dispersible organophilic clay, such as the commercially available quaternary ammonium salt modified montmorillonite sold by Southern Clay Products, of Gonzales, Tex., U.S.A., under the trade name Cloisite 10A. Not to be bound by theory, it is believed that for the organophilic clay to perform properly in a given system there must be an affinity of the quaternary ammonium moiety with some other component of the suspension. For example, in the dry state of the organophilic clay, the organic functional groups of the quaternary ammonium salt would be closely associated with the clay surface. However, if there is an affinity of the specific quaternary ammonium moiety of a specific organophilic clay for a specific carrier fluid, then when the clay and the fluid are mixed, the functional groups would "solvate" in the fluid, that is they would extend into the fluid rather than lie on the clay surface. Furthermore, it is believed that for the organophilic clay to perform properly in a given carrier fluid, there must be a proper organophilic clay particle-to-particle interaction in that carrier fluid to impart the needed viscosity, suspension, and thixotropic properties.

It is not uncommon that organophilic clays used in such systems require some means of overcoming the inherent associative forces tending to hold them together in order to disperse them in a carrier fluid when they are first mixed with carrier fluid to form suspensions. This is generally accomplished either by employing a minimal amount of sheer, usually a moderate to high shear rate, or by adding a component termed a "polar activator". Depending upon the specific organophilic clay and the specific carrier fluid used, shearing alone may suffice; sometimes very little shear is needed. Common polar activators are propylene carbonate, acetone, and mixtures of water and lower alcohols. Although polar activators are not needed in the formulations shown in the examples to follow, and it is generally an advantage of preferred embodiments of the Invention that polar activators are not needed, it is within the scope of the Invention to use polar activators. Mixtures of water and lower alcohols obviously cannot be used if they hydrate the material to be suspended. Acetone is seldom used because of safety and environmental concerns.

Thus, it would be commonly understood by one of ordinary skill in the art of formulating suspensions that not all organophilic clays would be useful in the present Invention, because only certain materials are suitable carrier fluids of the Invention. Suppliers routinely recommend that laboratory evaluations be conducted to determine the proper organophilic clay, the proper amount, and whether or not a polar activator is needed and, if so, the proper polar activator and the proper amount. A simple screening test of whether a specific organophilic clay (with or without polar activator included as purchased or added) is suitable with a specific carrier fluid can be carried out by adding the organophilic clay to be tested to the chosen carrier fluid and mixing, without the need to add any of the material that is ultimately to be suspended in the final suspension of the Invention. If the organophilic clay remains largely suspended in the carrier fluid under static conditions for at least one day, and if the addition of the organophilic clay results in at least some increase in the viscosity of the carrier fluid, then the organophilic clay will be suitable for use with that carrier fluid in the compositions and methods of the Invention.

The suspension agent is to be present in the concentrate at an amount of from about 0.5 to about 4.0% by weight of the powdered polymer being suspended. At concentrations below the lower limit of this range, undesirable polymer settling will be observed, while concentrations above the range will result in an unpumpable suspension.

A free-flow agent is a material that is added to a powder to ensure that it flows well and, for example, does not stick or clump together when it becomes wet. Most organophilic clays, as formulated by suppliers, already contain free-flow agents. The free-flow agent used is silica, chalk, a silicate, such as an aluminum silicate, a sodium silicate, a sodium aluminum silicate or a calcium silicate. The preferred free-flow agent is finely divided non-crystalline pyrogenic (or "fumed") silica. It is preferred that the suspensions of the present Invention comprise free-flow agents, but it is within the scope of the Invention that they do not. Sometimes it is not known whether commercial organophilic clays contain free-flow agents.

Conventionally, a thixotropic system is one that exhibits a time-dependent recovery of viscosity after shearing. When the shearing force is applied the viscosity decreases (shear thinning). When the shearing force is eliminated, the viscosity returns over a period of time to its original "at-rest" value. Conventionally, thixotropic agents are materials that impart, or help to impart, this property to a system. However, "thixotropic agent" is defined here as a material, other than the organophilic clay, added to the suspension in order to help reduce or eliminate settling. Though not to be bound by theory, it is believed that such agents probably reduce or eliminate settling by contributing to thixotropy. However, other mechanisms, such as volume exclusion, could be operative and "thixotropic agents" operating by other mechanisms would fall under the scope of the Invention. Thixotropic agents of the Invention must be soluble in the carrier fluid. Two such materials, for example, are a polyamide marketed by King Industries Specialty Chemicals, Norwalk, Conn., U.S.A., under the trade name Disparlon 6500 (hereinafter called D6500), and a hydroxypropyl cellulose marketed by Hercules Incorporated, Wilmington, Del., under the trade name Klucel-H (hereinafter usually called HPC). A suitable thixotropic agent for a specific carrier fluid is one that when added to the carrier fluid must be soluble in the carrier fluid, must increase the viscosity of the carrier fluid and must form a non-Newtonian shear-thinning fluid over the shear rate range of interest. (A Newtonian fluid has a constant viscosity when the shear rate is varied. A shear-thinning fluid demonstrates a decrease in viscosity as the shear rate is increased, and, conversely and more germane to the present Invention, demonstrates an increase in viscosity as the shear rate is decreased.) A material that does not meet all three criteria will not be suitable as a thixotropic agent in the Invention. These criteria can be used as a simple screening test to identify suitable thixotropic agents for a given carrier fluid; a candidate thixotropic agent is added to the carrier fluid without adding the material that is ultimately to be suspended, and the resulting fluid is examined to see that all three criteria are met. Not all thixotropic agents of the Invention will be suitable with all carrier fluids of the Invention, and vice versa, but any person skilled in the art of formulating suspensions can readily determine an appropriate thixotropic agent after a carrier fluid is selected.

In those instances where they are incorporated, after suitable organophilic clays and/or thixotropic agents are identified for a selected carrier fluid of the Invention, a suitable suspension agent (for a selected material to be suspended) may be determined by simple screening tests. Suspensions are made by mixing varying amounts of organophilic agent and/or thixotropic agent, the carrier fluid and the material to be suspended. The extent of settling of the suspensions under static conditions is observed, and a suitable suspension agent is chosen so that the suspension meets criteria important to the user, including the minimal settling criterion. For example, a compromise may be made between minimal settling and any or all of minimal cost, minimal concentration of the material to be suspended, maximal viscosity, minimal shear required to prepare, minimal hydration rate when an aqueous solution is made from the suspension, or other criteria.

The suspension is typically made commercially by pre-mixing all the solid components and then adding them to the liquid component(s). For ease of manufacture a solid thixotropic agent may be preferred but is not required. Thus, typically, the solids (material to be suspended, including a free-flow agent if necessary or present; thixotropic agent if it is a solid; and organophilic clay if needed, with a polar activator if needed or desired and if a solid) are pre-mixed by any suitable means, for example, but not limited to high-speed dispersers, ball-mills, and roller mills, and then added to the liquid (carrier fluid; thixotropic agent if it is a liquid; and polar activator if needed or desired and a liquid) under sufficient shear, for example in a blender, to de-agglomerate the organophilic clay platelets and allow association of the organophilic clay with the carrier fluid. Means of pre-blending the solids and then blending with the liquid with mixing are well known. Solids may be added to the liquid sequentially rather than pre-mixed; if so the sequence of addition is not critical. If the thixotropic agent is a liquid, it is added to the carrier fluid before any organophilic clay is added.

For making oilfield treatment fluids, for example for making viscosified aqueous fracturing fluids by adding suspensions of water-soluble polymers to aqueous fluids, the aqueous fluids are substantially any aqueous fluids capable of forming a solution with the selected polymer after the polymer suspension is mixed with the aqueous fluid. The term "solution" as used herein, in addition to true solutions, is intended to broadly encompass dispersions, emulsions, or any other homogeneous mixture of the polymer in the aqueous fluid. For example, if the viscosified aqueous solution is to be suitable for use in forming fracturing fluids, the aqueous solvent is preferably either a fresh water or a brine, such as a produced water from the subterranean formation. Produced water can be advantageous because of its low cost and ready availability and because it enables the practitioner to return produced water to the formation, thereby eliminating disposal thereof. The water used may also be municipal water or local surface water from creeks or lakes and the like. Numerous chemical additives such as antifoaming agents, acids or bases, salts, or other chemicals may be added to provide appropriate properties to the thickened aqueous fluid after the polymer suspension is added to water and hydrated. To make the final oilfield service fluid, such as a hydraulic fracturing fluid or gravelpack fluid, typically from about 3.4 to about 9.0 gallons of the polymer suspension is added to each 1000 gallons of water, although lesser or greater amounts can be used.

Among the advantages of the new class of compounds useful as carrier fluids, in addition to their environmentally friendly nature, are that they are "mutual solvents" and that they have higher flash points than certain other solvents that have been used in the past. By "mutual solvent" we mean that they are miscible with both hydrophilic and hydrophobic materials, such as water and oil. This results, for example, in faster wetting of the polymer particles when the suspension in this carrier fluid is mixed with water. A preferred carrier fluid, ethylene glycol monobutyl ether (EGMBE) has a flash point of about 66° C., whereas No. 2 diesel oil has a flashpoint of about 52° C.

An environmentally friendly material should be non-toxic and biodegradable. Standards for toxicity and biodegradability vary country-by-country throughout the world. With regard to sheen, under U.S. Regulations (40 CFR 110.3 and 110.4), discharges which:
(a) Violate applicable water quality standards, or
(b) Cause a film or sheen upon or discoloration of the surface of the water or adjoining shorelines or cause a sludge or emulsion to be deposited beneath the surface of the water or upon adjoining shorelines are prohibited.

With regard to "oil and grease" in discharged water, the applicable standard, per 40 CFR 435.15, as measured by the U.S. National Pollutant Discharge Elimination System Method 1664 is that well treatment, completion and workover fluids shall not exceed 42 mg/l for any one day or an average of daily values for 30 consecutive days of 29 mg/l.

Biodiesel and diesel fail both the sheen and the oil and grease criteria; ethylene glycol monobutyl ether meets them.

The discussion above has detailed the preparation and use of suspensions of water-soluble polymers. However, the carrier fluids and suspension agents of the present Invention can also be used to form suspensions of other materials which one desires to add to an aqueous fluid, such as an oilfield service fluid but does not want to suspend in water. A suspension may be desirable because the material to be suspended may be soluble, or partially or slowly soluble, in water or may react with water, or clump in water or have some other interaction with water that is undesirable until the final aqueous fluid is made. Such materials could be, but are not limited to, any salts or compounds that are insoluble in the carrier fluid, such as breakers or breaker aids, crosslinkers, accelerators, retarders, buffers, antioxidants and many other agents. The preceding discussion and comments regarding water-soluble polymers are applicable to such other materials as well (except, of course, for discussion and comments regarding what happens after the suspension is added to the aqueous fluid).

The final aqueous oilfield treatment fluid may also contain many materials that are soluble or insoluble in water or in the carrier fluid of the suspension of the Invention. Such materials may be, but are not limited to, buffers, bactericides, scale inhibitors or scale dissolvers, corrosion inhibitors or corrosion dissolvers, surfactants, foaming agents, breakers or breaker aids, crosslinkers, accelerators, retarders, antioxidants, flowback inhibitors, leak-off control agents or other permeability modifiers, stabilizers, and many other agents.

The final aqueous oilfield treatment fluid may contain a gas component, thus providing an energized fluid or foam. Energized fluids and foams are often used in the stimulation of oil and gas wells, and are formed and applied by injecting an aqueous solution concomitantly with a gas component. The dispersion of the gas into the base fluid in the form of bubbles increases the viscosity of such fluid and impacts positively its performance, particularly its ability to effectively induce hydraulic fracturing of the formation, and also its capacity to carry solids, such as proppants. The presence of the gas also enhances the flowback of the fluid. The gas component of the fluids of the present invention may be produced from any suitable gas that forms an energized fluid or foam when introduced into the aqueous medium. See, for example, U.S. Pat. No. 3,937,283 (Blauer et al.) hereinafter incorporated by reference. Preferably, the gas component comprises a gas selected from the group consisting of nitrogen, air, carbon dioxide and any mixtures thereof. The treatment fluid may contain from about 10% to about 90% volume gas component based upon total fluid volume percent, preferably from about 30% to about 80% volume gas component based upon total fluid volume percent, and more preferably from about 40% to about 70% volume gas component based upon total fluid volume percent. Typically, a foaming agent, which may be a surfactant, is used with the gas component to form the foam or energized fluid.

The suspensions of water-soluble materials, methods of making the suspensions, and methods of using the suspensions to form aqueous solutions are also useful in fields other than oilfield treatment, such as in the preparation and use of paints, cleaners and cosmetics.

The present Invention can be further understood from the following laboratory experiments.

EXAMPLE 1

Static Settling Tests with Ethylene Glycol Monobutyl Ether

Tests were performed at room temperature in stoppered 25 ml graduated cylinders using 25 ml of suspension that had been pre-blended in a Waring blender or in a laboratory overhead mixer. In all cases, the fluid contained 42% total solids and contained 58% ethylene glycol monobutyl ether as the carrier fluid. The solids comprised guar (containing<0.5% silica free-flow agent) obtained form Hercules Incorporated, Wilmington, Del., under the trade name Galactosol 270 and the indicated percentages (based on total solids) of the indicated additional solid materials. The results are shown in Table 1.

TABLE 1

| Percent Settling of Given Composition in Indicated Number of Hours | | | | |
|---|---|---|---|---|
| Composition (% of total solids) | 24 hrs | 48 hrs | 72 hrs | 96 hrs |
| 1% D6500 | 16 | 16 | 16 | 16 |
| 2% D6500 | 10 | 11 | 12 | 12 |
| 3% D6500 | 6 | 8 | 9 | 10 |
| 2% Cloisite 10A | 6 | 14 | 15 | 16 |
| 3% Cloisite 10A | 3 | 6 | 7 | 7 |
| 2% Cloisite 10A plus 1% D6500 | 1 | 2 | 3 | 4 |
| 2% Cloisite 10A plus 1.25% D6500 | 1 | 2 | 3 | 4 |
| 2% Cloisite 10A plus 1.5% D6500 | No data | 1 | 2 | 3 |

The data clearly show that in these experiments D6500 alone or Cloisite 10A alone do not properly prevent settling in this system even at very high concentrations. The two additives when used together are more effective at lower concentrations. Cloisite 10A alone at high concentration approaches the effectiveness of the mixtures at long times. However, organophilic clays alone lead to unpumpable suspensions at high concentrations, which is unacceptable. Table 2 shows other results with suspension agent concentrations that are too high. In the experiments of Table 2, the amount of guar was reduced to 36%, but nonetheless the resulting polymer suspensions were much more viscous than those of Table 1, as could be seen clearly when the jars containing the suspensions were inverted.)

TABLE 2

| Percent Settling of Given Composition in Indicated Number of Hours | | | | |
|---|---|---|---|---|
| Composition (% of total solids) | 24 hrs | 48 hrs | 72 hrs | 96 hrs |
| 3% Cloisite 10A plus 3% D6500 | 1 | 2 | 3 | 4 |
| 3% Cloisite 10A plus 2.5% D6500 | 2 | 3 | 5 | 6 |

EXAMPLE 2

Static Settling Tests with Biodiesel

Tests were performed as in Example 1. Again, in all cases, the fluid was 42% total solids; in these experiments, 58% of the fluid was the carrier fluid biodiesel. The solids comprised guar (containing<0.5% silica free-flow agent) obtained form Hercules Incorporated, Wilmington, Del., under the trade name Galactosol 270 and the indicated percentages (based on total solids) of the indicated additional solid materials.

Organophilic clays were chosen by a preliminary screening by adding the organophilic clay to be tested to the chosen carrier fluid and mixing, without the need to add any of the material that was ultimately to be suspended in the final suspension of the Invention. Results with organophilic clays that looked promising in the screening test are shown in Table 3. Many other organophilic clays did not give satisfactory results in the screening test; see Example 6, Table 6. The biodiesel was obtained from Stepan Company, Northfield, Ill. The organophilic clays were obtained from Southern Clay Products, of Gonzales, Tex., U.S.A., under the trade names SCPX 2355; Claytone APA; and Claytone AF. Modified montmorillonite Cloisite 10A and D6500 were the same materials as used in example 1.

TABLE 3

Percent Settling of Given Composition in Indicated Number of Hours

| Composition (% of total solids) | 24 hrs | 48 hrs | 72 hrs | 96 hrs |
|---|---|---|---|---|
| 4% SCPX 2355 | No Data | 0.5 | 1 | 1.5 |
| 2% SCPX 2355 plus 2% D6500 | 0.5 | 2 | 3 | 5 |
| 1.5% SCPX 2355 plus 2% D6500 | 2 | 2.5 | 5 | 5.5 |
| 4% D6500 | 4 | 5 | 6 | 7 |
| 2% SCPX 2355 | 2 | 4 | 5.5 | 7.5 |
| 2% Claytone APA plus 2% D6500 | 14 | 18 | 20 | 20 |
| 4% Claytone APA | 15.5 | 16 | 17.5 | 17.5 |
| 2% Claytone AF plus 2% D6500 | 17.5 | 18.5 | 20 | 20 |
| 2% Cloisite 10A plus 2% D6500 | 17.5 | 18.5 | 20 | 20 |
| 4% Claytone AF | 20 | 22 | 22 | 22 |

As was the case in Example 1, it is clear that a combination of intermediate amounts of a particular organophilic clay (SCPX 2355) and a particular thixotropic agent (D6500) is superior to either of those additives alone (except at very high concentrations of either alone). That combination gives results superior to results with the other clays that passed the screening test, with or without the thixotropic agent, including Cloisite 10A (which was effective at low concentrations with low concentrations of D6500 when the carrier fluid was ethylene glycol monobutyl ether).

EXAMPLE 3

Static Settling Tests of Hydroxypropyl Cellulose as Thixotropic Agent and EGMBE as Carrier Fluid Several samples of cellulosic ethers were tested for solubility in ethylene glycol monobutyl ether and those that were soluble were tested for suitability as thixotropic agents. Hydroxyethyl cellulose (HEC) obtained from Dow Chemical Company, Midland, Mich., under the trade name Cellosize HEC-10, and methyl hydroxypropyl cellulose (MHPC) supplied by Dow Chemical under the trade name Methocel K75M were found to be insoluble. However, a high molecular weight hydroxypropyl cellulose (HPC) obtained from Aldrich Chemical Company, Milwaukee, Wis., and manufactured by Hercules Incorporated, Wilmington Del., was found to be soluble and to substantially viscosity ethylene glycol monobutyl ether. The solids comprised guar (containing<0.5% silica free-flow agent) obtained form Hercules Incorporated, Wilmington, Del., under the trade name Galactosol 270 and the indicated percentages (based on total solids) of the indicated additional solid materials. The results are shown in Table 4.

TABLE 4

Percent Settling of Given Composition in Indicated Number of Hours

| Composition (% of total solids) | 24 hrs | 48 hrs | 72 hrs | 96 hrs |
|---|---|---|---|---|
| 2% Cloisite 10A plus 1% Aldrich HPC | 0 | 0 | 0 | 0 |
| 1% Cloisite 10A plus 1% Aldrich HPC | 0 | 0 | 0 | 0 |
| 0.75% Cloisite 10A plus 0.75% Aldrich HPC | 0 | 0 | 0 | 0 |
| 0.5% Cloisite 10A plus 0.5% Aldrich HPC | 4 | 10 | 12 | No data |
| 1% Aldrich HPC | 0 | 0 | 0 | 0 |
| 0.75% Aldrich HPC | 0 | 0.5 | 0.5 | 0.5 |
| 0.5% Aldrich HPC | 12 | 12 | 13 | No data |

HPC at concentrations above about 0.5% (based on total solids) is a suitable thixotropic agent.

EXAMPLE 4

Static Settling Tests of Hydroxypropyl Cellulose as Thixotropic Agent and Dipropylene Glycol n-Butyl Ether as Carrier Fluid Static settling tests were conducted as before with a suspension made up with 58% dipropylene glycol n-butyl ether (available from The Dow Chemical Company, Midland, Mich., under the trade name Dowanol DPnB) as the carrier fluid, 42% guar (containing<0.5% silica free-flow agent) obtained form Hercules Incorporated, Wilmington, Del., under the trade name Galactosol 270, and 0.75% (based on the weight of guar) hydroxypropyl cellulose marketed by Hercules Incorporated, Wilmington, Del., under the trade name Klucel-H as the thixotropic agent; no organophilic clay was used. As required, the thixotropic agent was soluble in the carrier fluid. The results are shown in Table 5.

TABLE 5

Percent Settling of Given Composition in Indicated Number of Hours

| Composition (% of total solids) | 72 hrs | 96 hrs |
|---|---|---|
| 0.75% Klucel-H HPC | 2 | 2 |

These results show that dipropylene glycol n-butyl ether is a very satisfactory carrier fluid with which the suspension agent for guar can be a small amount of this thixotropic agent without any organophilic clay.

EXAMPLE 5

Hydration Rates

The rate of hydration of guar when it was added to water as a polymer suspension of the Invention was measured and compared to the rate of hydration of guar when it was added to water as a polymer suspension in No. 2 diesel oil. Hydration rates were measured by determining the viscosity of the aqueous solution with a Fann 35 rheometer as a function of time. Typical results are shown in FIG. 1. The guar was purchased from Hercules Incorporated, Wilmington, Del., under the trade name Galactosol 270. The suspension of guar in ethylene glycol monobutyl ether contained 42% solids. The solids included guar (containing<0.5% free-flow silica); 2% (by weight of guar) Cloisite 10A; and 1% (by weight of guar) D6500. The suspension of guar in diesel contained the same solids. The polymer suspensions were added to water so that the final guar concentration was 20 ppt (pounds per thousand gallons) and the hydration rates were measured at 4.4° C. This low temperature represents very harsh conditions for the use of such a suspension, and it is clear that the polymer suspension prepared according to the Invention in ethylene glycol monobutyl ether hydrated more rapidly than the polymer suspension prepared in the conventionally used No. 2 diesel oil.

EXAMPLE 6

Organophilic Clay Screening

As an example of how organophilic clays were screened for suitability for use with a specific carrier fluid, a series of clays was compared by examining the settling of the clay alone in the carrier fluid. In each test, 0.3 g organophilic clay and 14.7 g biodiesel were mixed in a high-speed homogenizer for one minute and then examined after 24 hours. The biodiesel was obtained from Stepan Company, Northfield, Ill. The organophilic clays were obtained from Southern Clay Products, of Gonzales, Tex., U.S.A., under the indicated trade names. No thixotropic agent was used and no other material was suspended. The results are shown in Table 6.

TABLE 6

Percent Settling of Given Organophilic Clay in Biodiesel in 24 Hours

| Organophilic Clay | Percent Settling |
|---|---|
| Cloisite 10A | 77 |
| Claytone 2000 | 89 |
| Claytone II | 92 |
| Claytone EM | 89 |
| Claytone APA | 66 |
| Claytone IMG | 89 |
| SCPX 2174 | 79 |
| SCPX 2355 | 21 |

The polymer settling tests shown in Table 3 confirmed these results; the SCPX 2355 is a better organophilic clay for use in this biodiesel than the other clays tested.

EXAMPLE 7

Static Settling of CMHPG in Ethylene Glycol Monobutyl Ether

Tests were performed as in Example 1. Samples were made up with the polymer carboxymethylhydroxypropyl guar (CMHPG) using 40% total solids in ethylene glycol monobutyl ether as carrier fluid with 0.75% (based on the weight of CMHPG) Klucel-H HPC as the thixotropic agent, and with and without 0.75% (based on the weight of CMHPG) Cloisite 10A as organophilic clay. The results are shown in Table 7.

TABLE 7

Percent Settling of Given Composition in Indicated Number of Hours

| Composition (% of total solids) | 24 hrs | 96 hrs | 120 hrs |
|---|---|---|---|
| 0.75% HPC plus 0.75% Cloisite 10A | 0 | <1 | <1 |
| 0.75% HPC | 0.5 | 2 | 3 |

EXAMPLE 8

Viscosity of Guar Suspension as Function of Temperature

Figure 2:
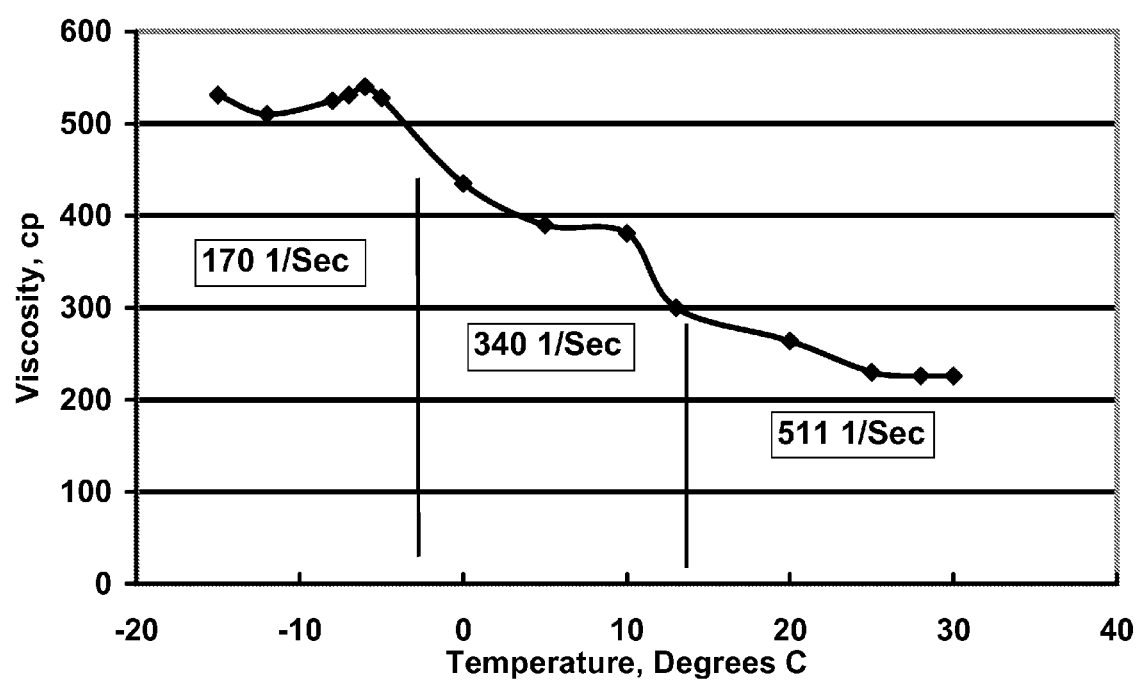
FIG. 2 shows the viscosity of a suspension of guar in ethylene glycol monobutyl ether as a function of temperature.

To demonstrate that suspensions of the present Invention have sufficiently low viscosities at low temperatures so as to be handled and pumped easily, a suspension was prepared containing 42% guar (containing<0.5% free flow agent), 2% Cloisite 10A (by weight of guar), and 1% D6500 (by weight of guar), in ethylene glycol monobutyl ether as the carrier fluid. The viscosity was determined on a Fann 35 rheometer. Materials and methods were as in previous examples. The results, shown in FIG. 2, show that the viscosity of the suspension remained less than 550 cP at a shear rate of 170 sec$^{-1}$ even at a temperature as low as −15° C.

EXAMPLE 9

Screening of Castor Waxes

Hydrogenated castor oils (sometimes called castor waxes) with or without clays are made for use as thixotropic agents or suspension agents. They are generally known to require heat for activation and as being intended for use with aliphatic solvents. Two materials obtained from Süd-Chemie, Louisville, Ky., were tested in ethylene glycol monobutyl ether without the addition of any additional material to be suspended. The first, sold under the trade name Rheocin, is described as a hydrogenated castor oil. The second, sold under the trade name Rheocin-T, is described as an inorganically-modified version of Rheocin. Rheocin-T is believed to contain a clay; it is not known whether the clay is organophilic. At concentrations of 0.5%, 1.0% or 2.0%, neither material dissolved in ethylene glycol monobutyl ether at room temperature and neither material appeared to increase the carrier fluid viscosity or impart any thixotropic behavior. Similar results (neither material appeared to increase the carrier fluid viscosity or impart any thixotropic behavior) were obtained with Rheocin-T at those concentrations even when the mixtures were heated to 49° C. and then cooled to room temperature. Some Rheocin dissolved in ethylene glycol monobutyl ether at 49° C., but at concentrations less than 2% of the carrier fluid (which would be 4.76% based on total solids of a 42% total solids suspension) it merely precipitated when cooled to room temperature. At 2% concentration it formed a solid gel when cooled to room temperature, but when shaken by hand the gel liquefied and did not return to the gel form on standing; this is known as "false body" in the paint industry. None of these results indicates suitability of these materials for use in the Invention with ethylene glycol monobutyl ether.

EXAMPLE 10

Viscosity of HMHPG Suspension as Function of Temperature and Time

The following components were mixed to produce slurry A and slurry B:

| Component | Slurry A Weight % | Slurry B Weight % |
|---|---|---|
| Polyflos HM22/XF | 38 | 38 |
| Dowanol ® DPM Mutual Solvent (Dipropylene glycol methyl ether) | 48.1 | 60.5 |
| Exxsol ® D80 Aliphatic Hydrocarbon | 12.4 | 0 |
| Claytone ® APA | 1.5 | 1.5 |

Figure 3:
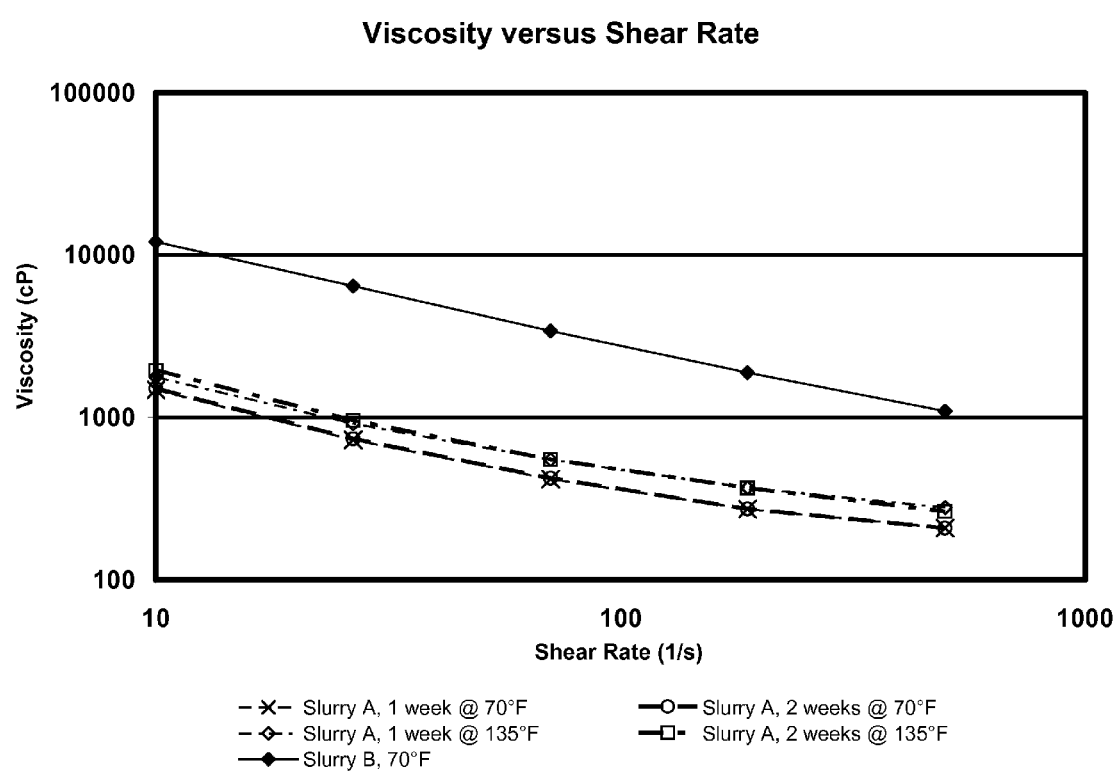
FIG. 3 illustrates viscosity versus shear rate for HMHPG suspended in mutual solvent and aliphatic oil, as well as only mutual solvent.

The following preparation procedure was adopted: the solvent, a mixture of Dowanol® DPM and Exxsol® D80, or DPM only, was placed in an appropriate blender cup. Claytone® APA was added and dispersed with agitation of sufficient shear. Subsequently Polyflos HM22/XF was slowly introduced and mixed until a uniform slurry resulted. Freshly prepared slurry B exhibited extremely high viscosity as shown in FIG. 3.

In order to evaluate stability of slurry A, portions of slurry A were stored at ambient temperature (70° F.) or in an oven (135° F.). The settling and packing of each sample were periodically observed, and the slurries remained stable. To assess whether the binary solvent system was substantially non-thickening, viscosity measurements were performed on a Bohlin rheometer at 70° F. FIG. 1 indicates that slurry A is highly stable, showing essentially no change in viscosity for weeks upon storage, either at ambient or elevated temperatures. This example illustrates that preparation of a stable slurry of HMHPG polymer in a thickening solvent can be achieved by addition of a small amount of aliphatic oils.

EXAMPLE 11

Viscosity of HMHPG Suspension used for Forming Foams

In these examples, foams were prepared and foam viscosity measurements were performed with a fully automated high-pressure-high temperature capillary rheometer (Chandler-Schlumberger). The equipment was calibrated in compliance with the ISO-9001 standard. It consists of a 416-mL closed flow loop in which aqueous solution and gas are injected in that order to achieve a desired liquid/gas composition of the foam. The equipment is provided with a mass flowmeter (Micro Motion ELITE CMF010 sensor provided with model 2700 transmitter) that determines flowrate and density of the fluid. The measured flowrate is used to determine the working speed of a positive displacement pump (Micropump Series 220) that was needed to achieve the shear rate indicated by the user through a software interface (Chandler FoamLoop DACS v. 1.12.1). The pressure drop along a 20-ft ¼" OD stainless steel tubing (Swagelok) was measured with a pressure transducer (Rosemount model 3051) to determine the apparent viscosity. The software referred above calculated shear rate and apparent viscosity using equations based on fluid mechanic principles [1]. Temperature was set through the software, which controls the operation of an oven (Lindberg/Blue Model MO1440SC) in which most of the tubing is enclosed. Temperature was maintained uniform in sections of the tubing outside the oven with an electrical heat tracing system (Thermon). The gas/liquid composition of the foam was verified through the measured density. In all cases, experiments were performed at pressure between 2,000 and 3,000 psi.

Figure 4:
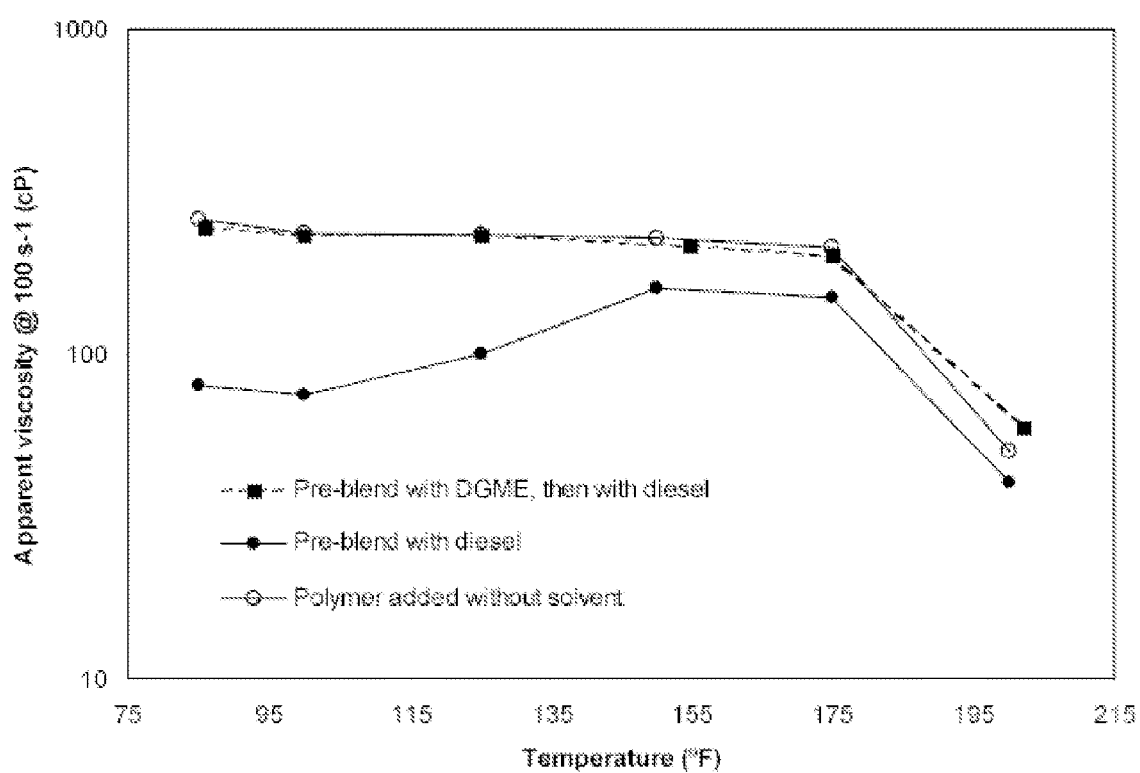
FIG. 4 shows viscosity versus temperature for foams based upon HMHPG polymers.

FIG. 4 shows (open circles) the viscosities ($\eta$) at several temperatures of a mixture of nitrogen ($N_2$) at 70% by volume based on total foam volume, and an aqueous base fluid comprised mainly of a foam forming viscoelastic surfactant, 0.3% by weight based on total base fluid weight of erucic amidopropyl dimethyl betaine, and 0.12 by weight based on total base fluid weight of hydrophobically modified C22 hydroxypropyl guar, Polyflos HM22/XF, to form a $N_2$-in-water foam. The hydrophobically modified guar had been pre-mixed with diesel #2 before adding to solution. Referring to FIG. 4, it is observed that viscosity was relatively low at temperatures near 85° F., but it increased at higher temperatures up to about 90° F.

FIG. 4 also shows (filled circles) the viscosities ($\eta$) at several temperatures of a mixture of $N_2$ at 70% by volume based on total foam volume, and an aqueous base fluid comprised mainly of a foam forming viscoelastic surfactant, 0.3% by weight based on total base fluid weight of erucic amidopropyl dimethyl betaine, and 0.12 by weight based on total base fluid weight of Polyflos HM22/XF. The HMHPG had been pre-mixed with dipropylene glycol methyl ether mutual solvent for 10 minutes, then with diesel #2 before adding to solution. It is seen that viscosity was high both at temperatures nearby 85° F., and also at higher temperatures up to about. 190° F.

FIG. 4 also shows (squares) the viscosities ($\eta$) at several temperatures of a mixture of $N_2$ at 70% by volume based on total foam volume, and an aqueous base fluid comprised mainly of a foam forming viscoelastic surfactant, 0.3% by weight based on total base fluid weight of erucic amidopropyl dimethyl betaine, and 0.12 by weight based on total base fluid weight of Polyflos HM22/XF. The HMHPG was added as dry powder, i.e., it was not premixed with any solvent. It is observed that viscosity was similar to the case for which the HMHPG was premixed with dipropylene glycol methyl ether mutual solvent and then with diesel, but not for the test for which the HMHPG was premixed with diesel only.

By pre-mixing the polymer with a mutual solvent, such as dipropylene glycol methyl ether, the polymer may be coated first with the mutual solvent, and not with diesel. Since the mutual solvent is also soluble in water, the polymer is dispersed readily once introduced into the aqueous environment, and the detrimental effect of diesel is avoided.

While the present Invention has been described with respect to a limited number of embodiments, those skilled in the art will appreciate numerous modifications and variations therefrom. It is intended that the appended claims cover all such modifications and variations as fall within the true spirit and scope of this Invention.

We claim:

1. A suspension in a non-aqueous fluid comprising:
   a. a carrier fluid comprising a mixture of aliphatic hydrocarbon and at least one of dipropylene glycol methyl ether, dipropylene glycol n-butyl ether, or mixtures thereof;
   b. a suspension agent comprising one or more organophilic clays; and
   c. 30 to 60% of a solid hydratable polymer wherein the hydratable polymer is a guar, guar derivative, cellulosic, or cellulosic derivative.

2. The suspension of claim 1 in which the suspension agent further comprises one or more thixotropic agents soluble in the carrier fluid.

3. The suspension of claim 1 wherein the hydratable polymer is a hydrophobically modified hydroxypropyl guar.

4. The suspension of claim 2 in which the thixotropic agents are selected from the group consisting of polyamide and hydroxypropyl cellulose.

5. The suspension of claim 1 in which the carrier fluid is a mixture of aliphatic hydrocarbon and dipropylene glycol methyl ether.

6. The suspension of claim 5 in which the hydratable polymer is a hydrophobically modified hydroxypropyl guar.

7. The suspension of claim 1 in which the suspension agent further comprises a thixotropic agent.

8. A method of suspending a hydratable polymer in a non-aqueous fluid, the method comprising:
   - providing a carrier fluid comprising a mixture of aliphatic hydrocarbon and at least one of dipropylene glycol methyl ether, dipropylene glycol n-butyl ether, or mixtures thereof;
   - b. providing a suspension agent comprising one or more organophilic clays;
   - c. providing the hydratable polymer; and
   - d. mixing said carrier fluid, the suspension agent and the hydratable polymer;

wherein the hydratable polymer is a guar, guar derivative, cellulosic, or cellulosic derivative, present in the final suspension in an amount of 30 to 60%.

9. The method of claim 8 in which the suspension agent comprises a solid portion, and the hydratable polymer and the solid portion of the suspension agent are pre-mixed before addition to the carrier fluid.

10. The method of claim 8 in which the hydratable polymer is a hydrophobically modified hydroxypropyl guar.

11. The method of claim 8 in which the suspension agent further comprises a thixotropic agent.

12. The method of claim 8 in which the carrier fluid is a mixture of aliphatic hydrocarbon and dipropylene glycol methyl ether.

13. A method of treating a well, free of surfactants other than components i and ii below, the method comprising:
   - a. providing a carrier fluid selected from the group consisting of:
     i. mutual solvent compounds having the formula:

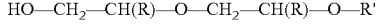
     HO—$CH_2$—CH(R)—O—$CH_2$—CH(R)—O—R' in which R is H or methyl and R' is H or alkyl having from 1 to 4 carbon atoms; and ii. mutual solvent compounds having the formula:

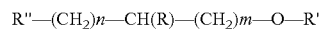
     R"—$(CH_2)n$—CH(R)—$(CH_2)m$—O—R' in which R is H or methyl, R' is H or alkyl having from 1 to 4 carbon atoms, R" is H or OH, n is from 0 to 3, m is from 1 to 3, the sum of n plus m is from 1 to 5; and iii. biodiesel and mixtures thereof;

iv. a mixture of aliphatic hydrocarbon and mutual solvent compounds having the formula:

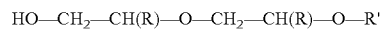
     HO—$CH_2$—CH(R)—O—$CH_2$—CH(R)—O—R' in which R is H or methyl and R' is H or alkyl having from 1to 4 carbon atoms; and v. a mixture of aliphatic hydrocarbon and mutual solvent compounds having the formula:

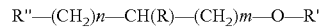
     R"—$(CH_2)n$—CH(R)—$(CH_2)m$—O—R' in which R is H or methyl, R" is H or alkyl having from 1 to 4 carbon atoms, R" is H or OH, n is from 0 to 3, m is from 1 to 3, the sum of n plus m is from 1 to 5, the formula containing at least one hydroxyl group;
   - b. providing a suspension agent comprising one or more organophilic clays;
   - c. providing a hydratable polymer;
   - d. mixing together the carrier fluid, the suspension agent and the hydratable polymer whereby a suspension is formed comprising 30 to 60% of the solid water-soluble polymer;
   - e. providing an aqueous fluid;
   - f. mixing the suspension with the aqueous fluid;
   - g. providing a foaming agent, providing a gas component, and mixing the suspension, the aqueous fluid, the foaming agent, and the gas component; and,
   - h. pumping the mixture downhole;

wherein the hydratable polymer is a guar, guar derivative, cellulosic, or cellulosic derivative.

14. The method of claim 13 carried out offshore.

15. The method of claim 13 in which the hydratable polymer is a hydrophobically modified hydroxypropyl guar.

16. The method of claim 13 in which the carrier fluid is a mixture of aliphatic hydrocarbon and dipropylene glycol methyl ether.

17. The method of claim 13 in which the carrier fluid comprises ethylene glycol monobutyl ether, dipropylene glycol methyl ether, dipropylene glycol n-butyl ether, or mixtures thereof.

\* \* \* \* \*